United States Patent [19]

Einsle et al.

[11] Patent Number: 4,728,470
[45] Date of Patent: Mar. 1, 1988

[54] APPARATUS AND METHOD OF PROCESSING A LIGHT WAVEGUIDE PRODUCT

[75] Inventors: Guenter Einsle, Munich; Ernst Mayr, Starnberg; Ulrich Oestreich, Munich; Gernot Schoeber, Munich; Wolfgang Schrey, Munich, all of Fed. Rep. of Germany

[73] Assignee: Siemens Aktiengesellschaft, Berlin and Munich, Fed. Rep. of Germany

[21] Appl. No.: 834,768

[22] Filed: Feb. 28, 1986

[30] Foreign Application Priority Data

Mar. 7, 1985 [DE] Fed. Rep. of Germany ....... 3508185

[51] Int. Cl.⁴ .............................................. B29D 11/00
[52] U.S. Cl. ..................................... 264/1.5; 264/237; 264/348; 425/71; 425/404; 425/445
[58] Field of Search ................. 425/71, 113, 404, 445; 264/1.5, 174, 237, 40.1, 348

[56] References Cited

U.S. PATENT DOCUMENTS

| | | | |
|---|---|---|---|
| 3,564,835 | 2/1971 | Keefe, Jr. et al. | 264/290.5 |
| 3,812,231 | 5/1974 | Hirschberg et al. | 264/290.5 |
| 4,154,783 | 5/1979 | Jackson | 264/1.5 |
| 4,414,165 | 11/1983 | Oestreich et al. | 264/1.5 |
| 4,541,979 | 9/1985 | Cooke et al. | 264/1.5 |
| 4,583,929 | 4/1986 | Becker et al. | 264/1.5 |
| 4,585,406 | 4/1986 | Ravela | 264/1.5 |

Primary Examiner—James Lowe
Attorney, Agent, or Firm—Hill, Van Santen, Steadman & Simpson

[57] ABSTRACT

A device for further processing a product which has a stranded element of at least one light waveguide or fiber loosely received in an envelope or sheath which was applied by an extruder, including two tempering chambers arranged in a line of feed from the last extruder with each chamber having at least one storage disk mounted for rotation therein.

10 Claims, 2 Drawing Figures

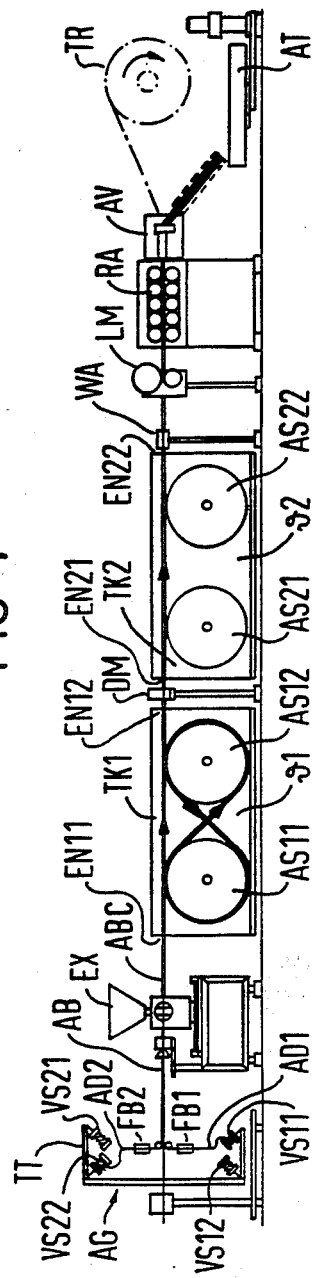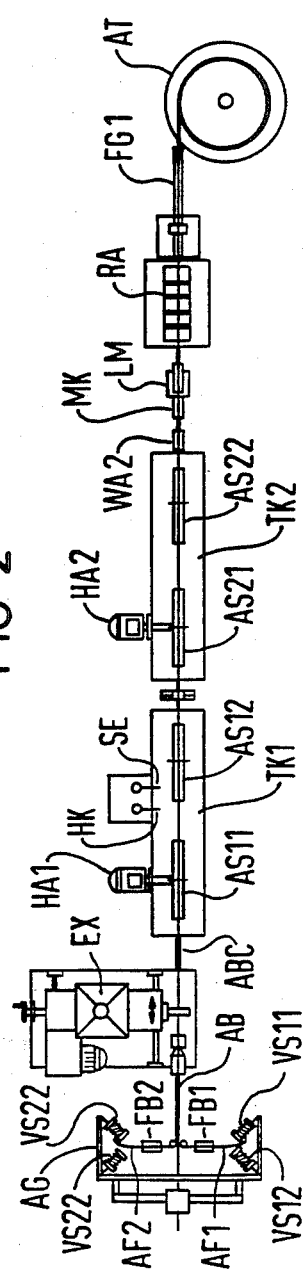

APPARATUS AND METHOD OF PROCESSING A LIGHT WAVEGUIDE PRODUCT

BACKGROUND OF THE INVENTION

The present invention is directed to a device or apparatus for further processing a product with a rope-like or strand-like element containing at least one light waveguide loosely received in a sheath of material which is applied by an extruder and the device includes two tempering chambers for treating the product, particularly the sheath after the product leaves the last extruder.

German OS No. 32 39 024 discloses a device for treating a product with a stranded member containing at least one light waveguide loosely received in an outer sheath. As disclosed, a first tempering chamber or basin is arranged to act on the sheath material as it leaves the extruder and travels in a straight line. Arranged at the output of the first chamber or basin is a beaded or belted haul-off and then a second tempering chamber in which the product is freely suspended in vertical loops and conducted over at least one running roller before being removed and subsequently wound on a drum or coiled on a rotating plate.

After introduction of the light waveguide into a hose-shaped outside sheath which is accomplished by extruding the sheath around the waveguide, care must be taken that the light waveguide has a defined length allocation which is usually a defined excess length in the ultimate condition with respect to the outside sheath. It must thereby be taken into consideration that certain longitudinal tensile stresses must usually be exerted on the light waveguide proceeding from the intake, for example, the fiber haul-offs, in order to produce a quiet running of the fiber and a defined seating in the curves. This is also true when a straight, elongated course such as, for example, when passing through a cooling basin, is provided within the production line or when the enveloped rope-like product proceeds freely suspended because the length allocation can be achieved at some arbitrary point in time only by means of an adequate retaining force which effects the seating and/or lie.

SUMMARY OF THE INVENTION

The object of the present invention is to create an optimally reliable precise length allocation of the fiber sheath to the fiber adapted to the purpose upon exploitation of the decelerating influence of the efflux, whereby, depending upon the product, the exploitable excess length of the fibers should lie between 0 and 1% in the stretched sheath.

To accomplish these goals, the present invention is directed to an improvement in a device for treating a product containing a rope-like or stranded element with at least one light waveguide loosely received in a sheath which was applied by at least one extruder and to a process of using the improved device. The device includes immediately downstream of the output of the last extruder, two independent tempering chambers. The improvements are that at least one storage disk is provided in each of the two chambers. Such storage disk offers the possibility that a decoupling of the light waveguide leads with respect to the deceleration events at the input is achieved by the looping in the form of at least one winding.

The storage disks advantageously have a diameter of $\geq 900$ mm in order to keep the mislength $ar/R$ (wherein $r$ = the radial migration of the fiber in the sheath from the center position and $R$ = the radius of the storage disk) which occurs under the influence of the deceleration forces as small as possible. This underlength of the fiber must be compensated by subsequent thermal shrinking of the sheath.

Other improvements and advantages of the present invention will be readily apparent from the following description, drawings and claims.

BRIEF DESCRIPTION OF THE DRAWINGS

FIG. 1 is a schematic side view of a light waveguide processing line including a treating device in accordance with the present invention; and FIG. 2 is a plan view of the line of FIG. 1.

DESCRIPTION OF THE PREFERRED EMBODIMENTS

The principles of the present invention are particularly useful in the device illustrated in FIGS. 1 and 2. In order to create a strand of one or more waveguides and then encase the strand loosely in a sheath, a bundling or processing line includes a payout stand AG which is equipped with a plurality of supply reels VS11, VS12, VS21 and VS22. As illustrated, two light waveguides AF1 and AF2 are paid out of the reels VS11 and VS22 and are combined into a stranded element AB in a known manner by utilizing rollers and fiber brakes FB1 and FB2. Instead of a bundle or stranded element of more than two waveguides, however, the element can consist of a single light waveguide.

The element AB is then further processed in a fashion as described hereinafter. The element AB of at least one light waveguide, after being supplied with a filling compound, if desired, proceeds to an extruder EX wherein a first envelope or sheath is formed of a plastic material and is applied to the original rope-like or stranded element AB to produce a product ABC surrounded with a loose sheath at the output of the extruder EX. If the sheath is to be composed of more than one layer, for example, two layers, a second extruder follows the extruder EX.

The product ABC, which is surrounded with a sheath of either one or two layers, then enters into the device of the present invention which includes a first tempering chamber TK1 which has a roughly rectangular cross-sectional and has two storage disks AS11 and AS12 mounted for rotation on spaced axes in the chamber TK1. The storage chamber TK1 is filled with a tempering fluid up to a defined or predetermined height generally up to about its axial height. The two storage disks AS11 and AS12 lie below the level of a straight line extending from a left-hand input EN11 to a right-hand output EN12. At least one of the two disks, as illustrated in FIG. 2 by the disk AS11, is connected to an auxiliary drive motor HA1, which will move the disk to compensate for frictional losses. The disks AS11 and AS12 are pure storage disks and are not used as haul-off disks. Since the disks are normally positioned to be immersed in a liquid coolant such as water, the positioning is not friction-free or splash-proof and the torque-controlled auxiliary drive motor HA1 sees to it that the frictional losses are compensated. The drive current of the electrical motor HA1 is, for example, advantageously kept constant at an empirically identified value so that the desired frictional compensation is achieved.

The tempering chamber TK1 is held at a predetermined temperature $\theta 1$, namely, in such a fashion that shall be set forth in greater detail. In order to achieve the optimum good decoupling of the light waveguide element from the braking effect of, for example, the lead playout brakes FB1 and FB2, at least one of the storage disks of the first tempering chamber TK1 is looped once by the product ABC. It is assumed in the present drawing that both disks AS11 and AS12 are looped in the form of a figure eight with the product first passing over disk AS11, then passing under and around disk AS12, then back under and around disk AS11 before running from the storage disk AS11 to the output EN12 of the first chamber.

As illustrated, a thickness measuring means DM can be provided at the output EN12 of the first chamber TK1 before the product ABC enters into a second tempering chamber TK2 which is constructed exactly in the same fashion as the first chamber TK1. It is assumed in the present example that the second tempering chamber TK2 which has a temperature $\theta 2$ is traversed by the product ABC moving in a straight line, i.e., it proceeds in a stretched form from an input EN21 to an output EN22 without being wrapped around either one of the storage disks AS21, AS22. If the coolant used in either one of the tempering chambers TK1 or TK2 is a liquid such as water, an appropriate drawoff or wiping device will be provided at the output thereof and as illustrated in FIG. 1, a wiping arrangement WA is provided at the output for the tempering chamber TK2.

For cooling purposes and also for heating, the chambers TK1 and TK2 can be filled as high as possible with a cooling and/or heating liquid which is correspondingly temperature-controlled. As shown by way of an example, the chamber TK1 can be provided with a temperature sensor SE (FIG. 2) and a coil HK which can used to either heat or cool the fluid in response to the temperature sensed by the sensor SE.

After passing through the wiping arrangement WA, the product ABC will then pass through a length measuring means LM to a treaded haul-off RA to be subsequently coiled on a plate coiler AT which is mounted to rotate on an axis which extends transverse to the straight line path through the tempering chambers TK1 and TK2. Reference AV denotes a cutting device for the product ABC.

As illustrated in FIG. 1, a cable drum TR shown in broken lines can be provided above or adjacent to the plate coiler AT. At the output of the haul-off RA, means are provided including a guide channel FG1 for selectively directing the output from the haul-off either to the plate coiler AT or to the cable drum TR and it is noted that the cable drum TR will have a smaller core diameter than the plate coiler AT.

Each of the two tempering storage chambers TK1 and TK2 can be differently set with respect to their decoupling properties and with respect to their temperature behavior. This offers the possibility of adapting the product processing line to various operating cases without involving any refitting operations.

The product line illustrated in the present invention can operate in various manners.

1. To provide an excess length of zero or a very small amount and to coil the tempered product onto the plate AT. This is accomplished by a stretched or straight line traversal of both tempering chambers TK1 and TK2 which contain cold water to cool the product down to room temperature and then it is coiled on the plate AT. $\theta 1 \approx \theta 2 \approx 20°$ C. The sheath is always subject to an afterstrinkage of a few $10^{-4}$ on the plate AT so that the initially presented underlength of the fibers will be compensated.

2. To provide a product having an excess length of 0 and winding the product on the drum TR which will have a far smaller core diameter, for example, 150 mm through 300 mm core diameter, than the diameter for the plate AT. To accomplish this, the process utilizes a stretched or straight line traversal of only the temperature chamber TK1 wherein at least one loop is formed on the disk AS21 or AS22 in the second tempering chamber TK2. Both chambers are filled with cold water up to a maximum of about 60% of their height due to the charging fashion of the chambers. $\theta 1 \approx \theta 2 \approx 10°$ through 20° C. The decoupling of the deceleration forces in the chamber TK2 allows winding to be carried out onto a far smaller drum core of the drum TR without having this defined length ratio of the fiber or, respectively, stranded element relative to the sheath.

2. To provide a product having a great excess length of 1% through 0.1% and then coiling the product onto the coil plate AT. To accomplish this, the process can use a straight line or stretched traversal of the chamber TK1 at a high temperature with $\theta 1 \approx 30°$ through 110° C. and then cooling on the plate AT. Another possibility is a looped traversal of both storage disks AS11 and AS12 of the chamber TK1, cooling with $\theta 2 \approx 10°$ through 20° C. to room temperature in the second tempering chamber TK2 utilizing either a straight line or stretched traversal or a looped traversal and then winding on the plate AT. When the chamber TK2 is traversed with a looped traversal, winding on the drum TR is also possible. In this case, the temperature of the chamber TK1 must be higher than when cooling on the plate AT since the plate has a larger diameter with values of between 1.1 and 1.5 m than the storage disks AS11 through AS22. The storage disks AS11 through AS22 should thus be as large as possible.

4. To provide a great excess length of 1% through 0.1% and then winding the product onto the drum RT. The process utilizes looping the product around both storage disks AS11 and AS12 in the chamber TK1 which is at a high temperature $\theta 1 \approx 30°$ C. through 110° C., then looping both storage disks AS21 and AS22 of the storage chamber TK2 at room temperature with $\theta 2 \approx 10°$ through 20° C., subsequently, after leaving the second chamber TK2 winding on the drum TR. In this example, the fiber is decoupled from the declerating forces in the chamber TK1 and the allocation of the length of the element to the sheath is defined at room temperature in the chamber TK2. The drum cannot do this because only the plate AT allows a free length adjustment of the sheath whereas the drum does not allow this to occur.

When excess lengths of the fiber must be set, one can calculate on coefficients of expansion of $\alpha \approx 1 \cdot 10^{-4}/k$ on average. $\Delta r/R$ is to be subtracted from this shrinkage as described above. When an element or bundle with six fibers, which element has an inside diameter of 2 mm and has a radial effective mobility for the element of 0.7 mm, traverses a storage disk having a diameter of 900 mm, the ultimate excess length when winding onto a reel should amount to $4 \cdot 10^{-3}$. For this to occur, the storage disks AS21 and AS22 were looped and the chamber TK2, which contains water stabilized at room temperature ($\theta 2 \approx 10°$-20°) is traversed. Then $$\frac{\Delta l}{l} = 4 \cdot 10^{-3} = \Delta\theta \cdot 10^{-4} - \frac{0.7}{450}, \text{ also}$$

$$\Delta\theta = \left(4 \cdot 10^{-3} + \frac{0.7}{450}\right) \cdot 10^4 = 56 \text{ K. and}$$

the temperature $\theta 1$ in the treatment or tempering chamber TK1 is 76° C. When winding is carried out directly onto a plate AT and a slow cooling is carried out on this plate, then one can count on a diameter D=1300 mm and the temperature difference is $$\Delta\theta = \left(4 \cdot 10^{-3} + \frac{0.7}{650}\right) \cdot 10^4 = 51 \text{ K.}; \theta 1 - 71° \text{ C.}$$

$\theta 2=20°$ C. being assumed. The differences are thus not very large but also cannot be neglected. Since partially cooled and still heated windings end up on one another and can mutually influence one another, further cooling on the plate AT is not problematical. The defined precooling in the chambers TK1 and TK2 is therefore very desirable.

The actually required temperatures deviation from the theoretical temperatures because the coefficient of expansion does not remain constant over a great temperature range. For exaple, it is lower at low temperatures and higher at high temperatures. Moreover, the precooling of the chambers coincides with the decoupling path. The cooling thus must begin as soon as possible following the extruder EX and must be as effective as possible. The highest temperature $\theta 1$ in the tempering chamber TK1 occurs given the maximum excess length is shown by the following equations:

$$\frac{\Delta l}{l} = 0.8 \cdot 10^{-2}; \frac{\Delta r}{R} = \frac{1.1}{450},$$

$$0.8 \cdot 10^{-2} = 10^{-4} \cdot \Delta\theta - \frac{1.1}{450}$$

$$= \left(0.8 \cdot 10^{-2} + \frac{1.1}{450}\right) \cdot 10^4 = 105 \text{ K., also}$$

$\theta 1 = 125°$ C., when $\theta 2 = 20°$ C.

Here, thus, water is no longer possible as a coolant in the treating or tempering chamber TK1 and either glycol can be utilized or hot air must be utilized. If it is assumed that the product departs the extruder EX at a temperature of about 200° C. on average, then about 80° K. must be removed from the product in the first chamber TK1. The treating chamber TK1 is therefore optionally operated with a hot liquid or with hot air. Given a plurality of extruders, lowering the temperature can also be undertaken by means of auxiliary cooling devices which are positioned between two extruders.

The manner of looping is determined by the speed of travel. With low speeds, both storage disks, for example, AS11 and AS12, can be looped overall in the form of an O. By contrast, a looping in the form of a figure 8 is more expedient at high speeds. Except for very thick sheaths for the product ABC, a disk can also be fundamentally looped twice so that the self-laying forces of the relatively stable leads are exploited.

As a result of its special design, the device of the present invention offers the possibility of adapting a processing or bundling line to various operating cases and types of cable without extensive refitting. The type of winding onto a drum or coiling on a plate coiler is thereby freely selectable at the output side.

Although various minor modifications may be suggested by those versed in the art, it should be understood that we wish to embody within the scope of the patent granted hereon, all such modifications as reasonably and properly come within the scope of our contribution to the art.

We claim:

1. A process for treating a product having a strand element of at least one waveguide loosely received in a sheath extruded thereon, said process including providing first and second treating chambers, each treating chamber having an inlet, an outlet disposed on a line, at least two storage disks aligned one after another along said line and mounted for rotation on axes spaced along said line in the chamber and means for driving at least one disk of each chamber so that a precise length allocation between the light waveguide and sheath is obtained, said first chamber being positioned with its inlet receiving the product as it leaves the last extruder, said second chamber being arranged with its inlet positioned to receive the product leaving the outlet of the first chamber; providing a coolant in the first chamber and a second coolant in the second chamber; maintaining the coolants at the desired temperatures for each chamber; passing the product sequentially through the first chamber and into the second chamber then looping the product around at least one storage disk in the second chamber before passing it out of the outlet of the second chamber, positively rotating at least one of the disks in each chamber, and then collecting the treated product by winding the product onto a drum.

2. A process according to claim 1, wherein said step of looping comprises looping the product in a figure eight configuration between the two disks of the second chamber.

3. A process for treating a product having a strand element of at least one waveguide loosely received in a sheath extruded thereon, said process including providing first and second treating chambers, each treating chamber having an inlet and an outlet disposed on a line, at least two storage disks aligned one after another along said line and mounted for rotation on axes spaced along the line in the chamber and means for driving at least one disk of each chamber so that a precise length allocation between the light waveguide and sheath is provided, said first chamber being positioned with its inlet receiving the product as it leaves the last extruder, said second chamber being arranged with its inlet positioned to receive the product leaving the outlet of the first chamber; providing a coolant in the first chamber and a second coolant in the second chamber; maintaining the coolants at the desired temperatures for each chamber; passing the product sequentially through the first chamber and the second chamber by winding the product arount at least one storage disk in the first chamber; positively rotating at least one of the disks in each chamber; and then collecting the product by coiling the product onto a rotating plate.

4. A process according to claim 3, wherein said step of winding comprises winding the product in a figure eight configuration on the two disks of the first chamber.

5. A device for further processing a product having a strand element of at least one light waveguide loosely received in a sheath applied by at least one extruder, said device having two independently operated tempering chambers disposed one after another downstream of the last extruder with the improvements comprising that each of the chambers having an input and an output disposed on a line and at least two storage disks being disposed below the line and spaced therealong, said disks being mounted for rotation on spaced axes in the chamber, at least one storage disk of each chamber being provided with an auxiliary drive having a torque control so that a precise length allocation between the light waveguide and the elements is provided.

6. In a device according to claim 5, wherein each of the two chambers has means for utilizing a treating fluid selected from a group consisting of liquids and air.

7. In a device according to claim 5, wherein each of the chambers has means for stabilizing the temperature value of a fluid contained therein so that different temperature values can be obtained for each chamber.

8. In a device according to claim 5, wherein a first chamber of the two tempering chambers is positioned immediately following the last extruder of a device for applying the sheath on said product.

9. In a device according to claim 5, wherein each of the storage disks in said tempering chamber is selected to be as large as possible and have a diameter of at least 900 mm.

10. In a device according to claim 5, which includes means adjacent the outlet end of the second chamber for selectively directing the treated product between a drum for winding and a plate for coiling.

* * * * *